(12) United States Patent
Hagerty et al.

(10) Patent No.: US 12,508,165 B2
(45) Date of Patent: Dec. 30, 2025

(54) HEATED HYDROCOLLOID PATCHES FOR SKIN TREATMENT

(71) Applicant: ASO LLC, Sarasota, FL (US)

(72) Inventors: Brooke A. Hagerty, Bradenton, FL (US); Edmund A. Sinda, Bradenton, FL (US); Mira Dosen, Sarasota, FL (US)

(73) Assignee: ASO LLC, Sarasota, FL (US)

( * ) Notice: Subject to any disclaimer, the term of this patent is extended or adjusted under 35 U.S.C. 154(b) by 209 days.

(21) Appl. No.: 18/376,573

(22) Filed: Oct. 4, 2023

(65) Prior Publication Data

US 2024/0108513 A1 Apr. 4, 2024

Related U.S. Application Data

(60) Provisional application No. 63/413,004, filed on Oct. 4, 2022.

(51) Int. Cl.
*A61F 13/00* (2024.01)

(52) U.S. Cl.
CPC .... *A61F 13/00* (2013.01); *A61F 2013/00646* (2013.01); *A61F 2013/00889* (2013.01); *A61F 2013/00906* (2013.01); *A61F 2013/00919* (2013.01)

(58) Field of Classification Search
CPC .. A61F 2013/00953; A61F 2013/00187; A61F 2013/002; A61F 2013/0095; A61F 2013/0096; A61F 7/02; A61F 2007/0219; A61F 2007/0226; A61F 2007/0095; A61F 2007/0096; A61F 2007/0242; A61F 2007/0277; A61F 2007/0279; A61F 2013/55105; A61F 2013/5513; A61F 13/00063; A61F 13/00638; A61B 50/30; A61B 42/40

See application file for complete search history.

(56) References Cited

U.S. PATENT DOCUMENTS

| | | | | |
|---|---|---|---|---|
| 4,325,254 A | * | 4/1982 | Svacina | G01K 13/10 374/E11.018 |
| 5,135,518 A | * | 8/1992 | Vera | A61F 7/02 602/41 |
| 5,181,905 A | * | 1/1993 | Flam | A61L 15/56 374/161 |
| 5,366,491 A | * | 11/1994 | Ingram | A61F 7/02 607/108 |
| 5,630,959 A | * | 5/1997 | Owens | A61F 7/02 426/243 |

(Continued)

OTHER PUBLICATIONS

Hagerty et al.—Cold Hydrogel Skin Patch, U.S. Appl. No. 18/376,600, filed Oct. 4, 2023.

(Continued)

*Primary Examiner* — Kari K Rodriquez
(74) *Attorney, Agent, or Firm* — GrayRobinson, P.A.

(57) ABSTRACT

A skin patch that is adherable to human skin over a blemish on the skin has an outer layer that forms a physical barrier over the blemish when applied thereto and a hydrocolloid layer attached to the outer layer that contacts the blemish when applied thereto. A thermochromic material is on the skin patch and/or waterproof packaging encapsulating the skin patch. The thermochromic material indicates the skin patch is at a predetermined temperature.

8 Claims, 4 Drawing Sheets

(56) References Cited

U.S. PATENT DOCUMENTS

| | | | | | |
|---|---|---|---|---|---|
| 5,817,149 | A | * | 10/1998 | Owens | A61F 7/02 607/114 |
| 6,235,047 | B1 | * | 5/2001 | Augustine | A61F 7/02 602/14 |
| 6,336,935 | B1 | * | 1/2002 | Davis | A61F 7/034 607/114 |
| 7,238,196 | B2 | * | 7/2007 | Wibaux | A61F 13/00051 607/152 |
| 7,934,495 | B2 | * | 5/2011 | Goldenberg | A61K 8/922 126/45 |
| 2014/0221896 | A1 | * | 8/2014 | Freer | A61F 13/0289 602/43 |

OTHER PUBLICATIONS

Hagerty et al.—Cold Hydrogel Skin Patches, U.S. Appl. No. 18/376,612, filed Oct. 4, 2023.
Hagerty et al.—Multifunctional Facial Patch Product, U.S. Appl. No. 18/376,626, filed Oct. 4, 2023.
Hagerty et al.—Skin Treatment Product, U.S. Appl. No. 18/376,595, filed Oct. 4, 2023.
Hagerty et al.—Tinted Skin Patches for Covering Skin Blemishes, U.S. Appl. No. 18/376,587, filed Oct. 4, 2023.

* cited by examiner

HEATED HYDROCOLLOID PATCHES FOR SKIN TREATMENT

CROSS-REFERENCE TO RELATED APPLICATION

This claims the benefit of priority from Application No. 63/413,004, filed Oct. 4, 2022, which is incorporated by reference in its entirety.

FIELD

This disclosure relates to skin treatment and more particularly, to hydrocolloid skin patches.

BACKGROUND

Acne is a common skin condition affecting up to fifty million Americans. Approximately 85% of individuals between 12 and 24 years old have acne. In recent years, therapeutic patches that can be placed on skin blemishes have been introduced.

BRIEF SUMMARY

A problem with conventional skin patches is that they are designed to be applied at ambient temperature. What is needed is a new type of skin patch that can be heated and placed on the skin while hot. The heat may assist the healing process.

Such a skin patch is adherable to human skin over a blemish on the skin and has an outer layer that forms a physical barrier over the blemish when applied thereto and a hydrocolloid layer attached to the outer layer that contacts the blemish when applied thereto. A thermochromic material is on the skin patch and/or waterproof packaging encapsulating the skin patch. The thermochromic material indicates the skin patch is at a predetermined temperature.

The skin patch may also include one or more of the following features.

The thermochromic material may be on the outer layer.

The thermochromic material may be on the waterproof packaging.

The thermochromic material may be on the skin patch and the waterproof packaging may include a transparent section through which the thermochromic material is visible from outside the packaging.

The predetermined temperature may be 80 to 100 degrees F.

The predetermined temperature may be 105 degrees F.

An example of a method of treating a skin blemish includes heating a hydrocolloid skin patch with a thermochromic material that indicates the skin patch is at a predetermined temperature and applying the hydrocolloid skin patch to the skin blemish once the thermochromic material indicates the skin patch is at the predetermined temperature.

This method may also include one or more of the following features.

The skin patch may include (a) an outer layer that forms a physical barrier over the blemish when applied thereto and (b) a hydrocolloid layer attached to the outer layer that contacts the blemish when applied thereto. The thermochromic material may be on the outer layer.

The thermochromic material may be on waterproof packaging encapsulating the skin patch.

During heating, the skin patch may be encapsulated in waterproof packaging.

The thermochromic material may be on the skin patch and the waterproof packaging may include a transparent section through which the thermochromic material is visible from outside the packaging.

The predetermined temperature may be 80 to 100 degrees F.

The predetermined temperature may be 105 degrees F.

Heating may be performed in hot water.

A second method includes making a hydrocolloid skin patch effective for treating a skin blemish by applying a thermochromic material to the hydrocolloid skin patch and/or waterproof packaging encapsulating the hydrocolloid skin patch. The thermochromic material indicates the skin patch is at a predetermined temperature.

This method may also include one or more of the following features.

The skin patch may include (a) an outer layer that forms a physical barrier over the blemish when applied thereto and (b) a hydrocolloid layer attached to the outer layer that contacts blemish when applied thereto. The thermochromic material may be on the outer layer.

The thermochromic material may be on waterproof packaging encapsulating the skin patch.

The waterproof packaging may include a transparent section through which the thermochromic material is visible from outside the packaging.

The predetermined temperature may be 80 to 100 degrees F.

The predetermined temperature may be 105 degrees F.

Applying a thermochromic material may include printing a thermochromic ink.

The skin patch and methods may include any combination of these features.

DETAILED DESCRIPTION OF EXAMPLES

This disclosure describes examples and aspects, but not all possible examples or aspects of the skin patch and related methods. Where a particular feature is disclosed in the context of a particular aspect or example, that feature can also be used, to the extent possible, in combination with and/or in the context of other aspects and examples. The skin patch may be embodied in various forms and should not be construed as limited to only the examples described here.

As used herein, the term "blemish" refers to any area of skin redness, which may, for example, be caused by wounds, acne, scars, infections, pigmentation, or the like.

Figure 1:
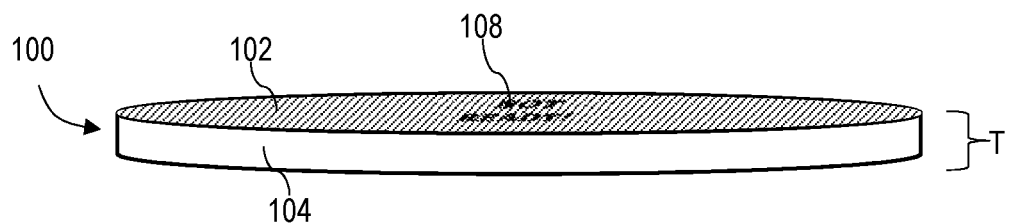
FIG. 1 is a top perspective view of a first example of a skin patch.
Figure 2:
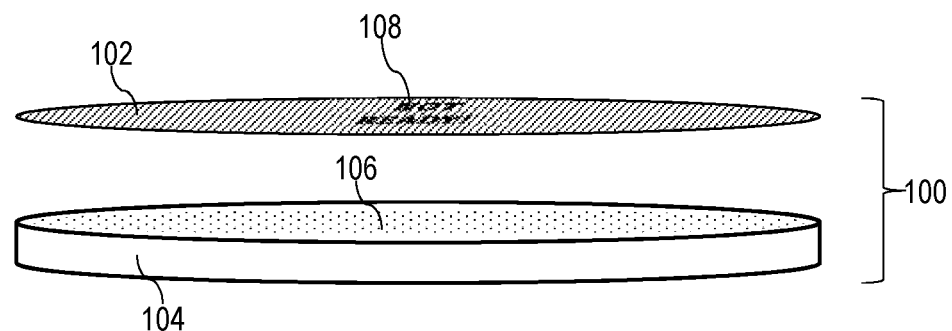
FIG. 2 is an exploded view thereof.

Referring to FIGS. 1 and 2 an example of a skin patch 100 includes an outer layer 102 and a hydrocolloid layer 104. The outer layer 102 may be secured to the hydrocolloid layer via an adhesive 106 applied to a surface of the hydrocolloid layer 104.

The outer layer 102 covers the underlying hydrocolloid layer 104 and protects it from external contamination. The outer layer 102 also deters exudate from leaking outside of the skin patch 100.

The outer layer 102 includes a backing material suitable for use in wound dressings. Examples of such backing materials include but are not limited to, woven or nonwoven fabrics, knits, films, or the like. Backing materials used in conventional wound dressings may be used.

In certain examples, the backing material may be an opaque, translucent, or transparent polymeric elastic film.

The backing material may be flexible and conformable to different surfaces of the body. When the backing material is applied to the skin, it can conform to the shape of the skin even if the wearer moves. The backing material may be constructed in such a way that it stretches and contracts to adapt to bodily movement.

Examples of specific backing materials include, but are not limited to polyethylene, polyurethane, co-polyester, polyether block amide films, PVC, or the like.

The outer layer 102 may be waterproof and/or may be breathable with a moisture vapor transmission rate above 0%.

As an alternative to using an adhesive 106, the hydrocolloid layer 104 itself may serve as an adhesive.

The hydrocolloid material of the hydrocolloid layer 104 may be hydrophilic and form a substrate that can adhere to skin. The hydrocolloid material can absorb fluid while applied to the skin of the wearer. Whether the hydrocolloid layer 104 itself is adhesive, or whether an adhesive 106 is utilized, the skin patch 100 may have sufficient adhesion for prolonged contact with the skin of the wearer.

Hydrocolloid materials may have a polymeric structure in which a hydrophilic polymer forms a three-dimensional cross-linked network. Hydrocolloids are able to hold water within this network.

Hydrocolloid materials may include one or more natural hydrophilic polymers such as, for example, pectins, gelatins, cellulosic materials such as carboxymethylcelluloses (CMC), collagens, dextrans, elastins, chitins, chitosans, alginates, or the like.

Hydrocolloid materials may include one or more synthetic hydrophilic polymers such as, for example, polyacrylic acids (PAA), polyvinyl alcohols, polyethylene glycols, polyvinyl pyrrolidones, polyurethanes, polyhydroxyethyl methacrylates, or the like.

Hydrocolloid materials may also include a cross-linking agent, Examples of cross-linking agents include, but are not limited, to calcium salts such as calcium chloride, calcium sulfate, calcium nitrate; zinc salts such as zinc nitrate, zinc chloride, zinc sulfate; ammonium persulfate, glutaraldehyde or the like.

The hydrocolloid material may also include a pressure sensitive adhesive, such as poly-isobutylene, or the like.

The skin patch 100 is designed to be heated prior to application to skin. When some hydrocolloid materials are heated, they may become too pliable to adhere to the skin sufficiently. To improve the mechanical properties of a heated hydrocolloid material, certain examples of the hydrocolloid material include a chemical agent useful in improving the heat tolerance of the hydrocolloid material. Examples of such chemical agents may include, but are not limited to, calcium chloride, sodium chloride, acetic acid, or another agent that is known to increase the boiling point of water. Another form of the skin patch which may better retain the adhesive qualities of the skin patch 100 after heating includes a reduced amount of poly-isobutylene in the hydrocolloid layer if any is present.

Certain examples of the skin patch 100 have a thickness T of 0.1 mm to 1.5 mm or 0.12 mm to 1.5 mm.

Certain examples of the hydrocolloid material may also include one or more other ingredients such as, for example, therapeutically active ingredients such as wound healing promoting compounds and antimicrobial compounds. Other ingredients may include beautifying ingredients, such as aloe, hyaluronic acid, peptides, apple cider vinegar, collagen, turmeric, green tea, Vitamin A, Vitamin C, Vitamin E, or any other combination of ingredients.

The skin patch 100 also includes a thermochromic material 108 that reversibly changes color when heated above a temperature that causes a color or appearance transition in the thermochromic material 108. Thermochromic materials include, for example, certain liquid crystals and organic dyes, such as leuco dyes. Thermochromic materials 108 can be mixed with other materials to create unique visual effects.

Conventional thermochromic inks, thermochromic plastics, thermochromic dyes, thermochromic powders, thermochromic films, or the like may serve as the thermochromic material 108. The purpose of the thermochromic material 108 is to indicate to the wearer when the skin patch 100 is at a predetermined temperature for placement on the skin.

In the example of FIGS. 1 and 2, the thermochromic material 108 is on the outer layer 102 in the form of a visible indicator. This example allows the thermochromic material 108 to convey a message to the wearer when it is ready for application to the skin.

The thermochromic material 108 is selected to provide an indicator relating to the temperature of the skin patch 100. The indicator may be the appearance of a visible indicator, a color change, a thermometer, or the like. The thermochromic material 108 provides the indicator at a predetermined temperature. For example, if the predetermined temperature is 80-100 degrees F. or about 90 degrees F., the indicator may appear at 80-100 degrees F. or about 90 degrees F. In other examples, the predetermined temperature may be a temperature such as 105 degrees F. in which the skin patch 100 is too hot to be applied to skin.

In certain examples, thermochromic material 108 becomes visible when the skin patch 100 reaches a predetermined temperature and is less visible when the skin patch 100 is not at the predetermined temperature. This may be achieved, for example, by selecting an initial, inactive color for the thermochromic material 108 that matches the color of outer layer 102 or is not visible on the outer layer 102. In this manner, when the thermochromic material 108 is heated to a predetermined temperature, it becomes activated, changes color, and the indicator becomes visible.

In other examples, the thermochromic material 108 may provide an indicator that is visible to tell the wearer when the skin patch 100 is not at the predetermined temperature. In this case, the thermochromic material 108 may become less visible when the skin patch 100 is at the predetermined temperature.

The thermochromic material 108 can also present an alternative indicator in the event the temperature of the skin patch 100 exceeds a predetermined temperature. In this manner, the thermochromic material 108 can indicate to the user if the skin patch 100 is too hot to be applied to the skin.

The indicator may have many different forms. Examples of types of possible indicators include words, letters, punctuation, symbols, colors, and the like. The indicator may be any indicator that the wearer can understand indicates a temperature state of the skin patch 100.

Figure 3:
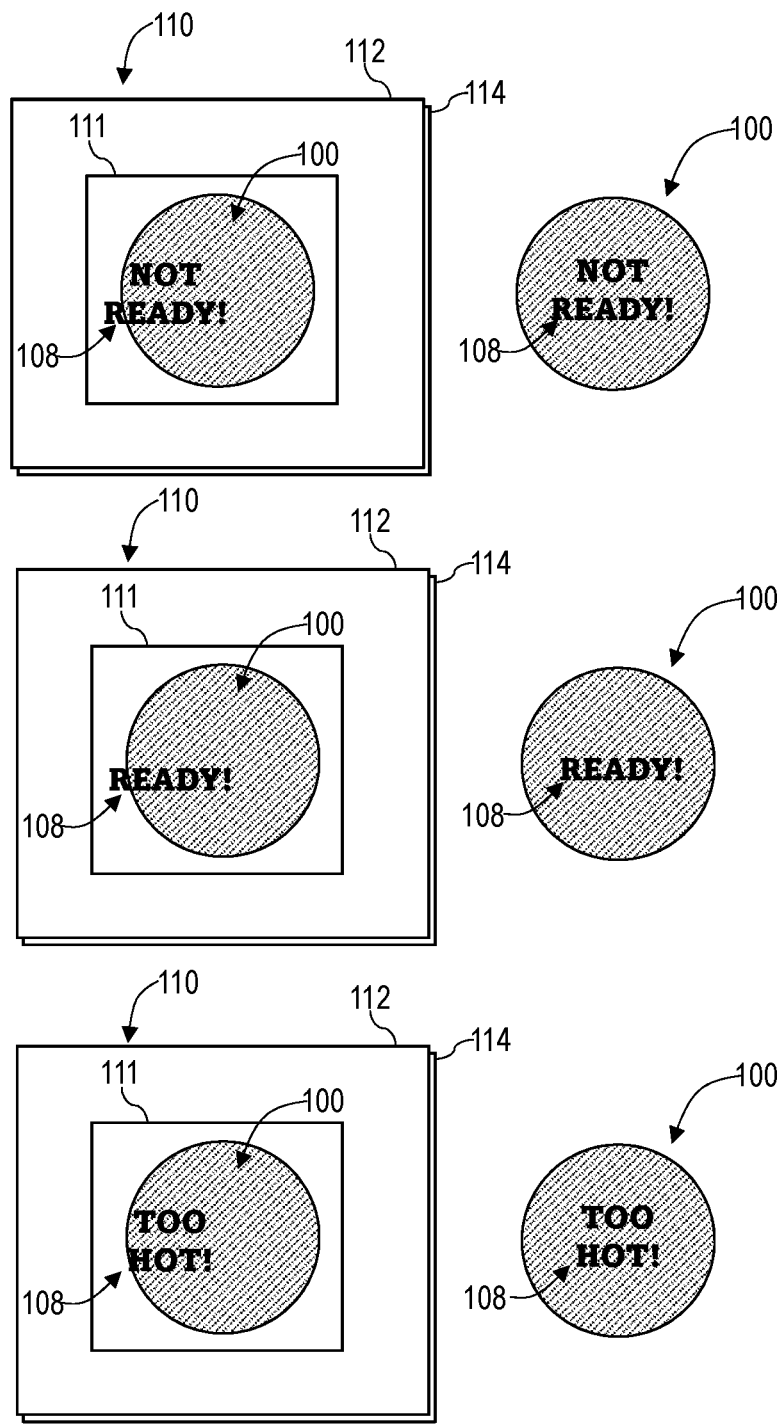
FIG. 3 shows the skin patch inside and outside packaging and in different states of heating.

Referring to FIG. 3, the skin patch 100 is in packaging 110, such as a wrapper, and the thermochromic material 108 is on the packaging 110. The packaging 110 encapsulates the skin patch 100 until it is ready to be used. The packaging 110 includes an upper layer 112 and a lower layer 114 that are attached together along their perimeters and between which the skin patch 100 is positioned. The upper layer 112 and lower layer 114 are adhered together. The adhesive is such that the user can peel the upper layer 112 away from the lower layer 114 to remove the skin patch 100.

The packaging 110 forms a substantially waterproof barrier around the skin patch 100 so that the skin patch 100 can be heated by placing the packaging 110 in hot water. As hydrocolloids naturally absorb liquids, the use of waterproof packaging 110 is useful if heating in hot water.

The packaging 110 may be made from packaging material such as acrylic, polyethylene terephthalate, amorphous copolyester, polyvinyl chloride, polycarbonate, cyclic olefin copolymers, polyethylene, or the like.

In the example of FIG. 3, the packaging 110 includes a thermochromic material 108 that changes color when the predetermined temperature is reached. The thermochromic material 108 is applied to the upper layer 112.

As shown in the upper panel of FIG. 3, prior to the packaging 110 being placed in hot water, thermochromic material 108 may notify the user that the skin patch 100 is not at the predetermined temperature or the packaging 110 may have no visible indicator.

As shown in the middle panel of FIG. 3, once the packaging 110 containing the skin patch 100 reaches the predetermined temperature, the thermochromic material 108 changes color to indicate the skin patch 100 is at the predetermined temperature and is ready to be placed on the skin.

As shown in the bottom panel of FIG. 3, the thermochromic material 108 may also be used to provide an indicator that notifies the wearer when the skin patch 100 is too hot for placement on the skin. This is a safety precaution.

The packaging 110 may be opaque, translucent, or transparent. In the example of FIG. 3, the packaging 110 includes a transparent section 111 through which the skin patch 100 is visible. If the skin patch includes a thermochromic material 108, the transparent section 111 permits the thermochromic material 108 on the skin patch 100 to be visible from outside the packaging 110.

As the skin patch 100 is worn on the skin and cools, the thermochromic material 108 may change color to become less visible so as to not have a substantially visible indicator while being worn for a long period.

Figure 4:
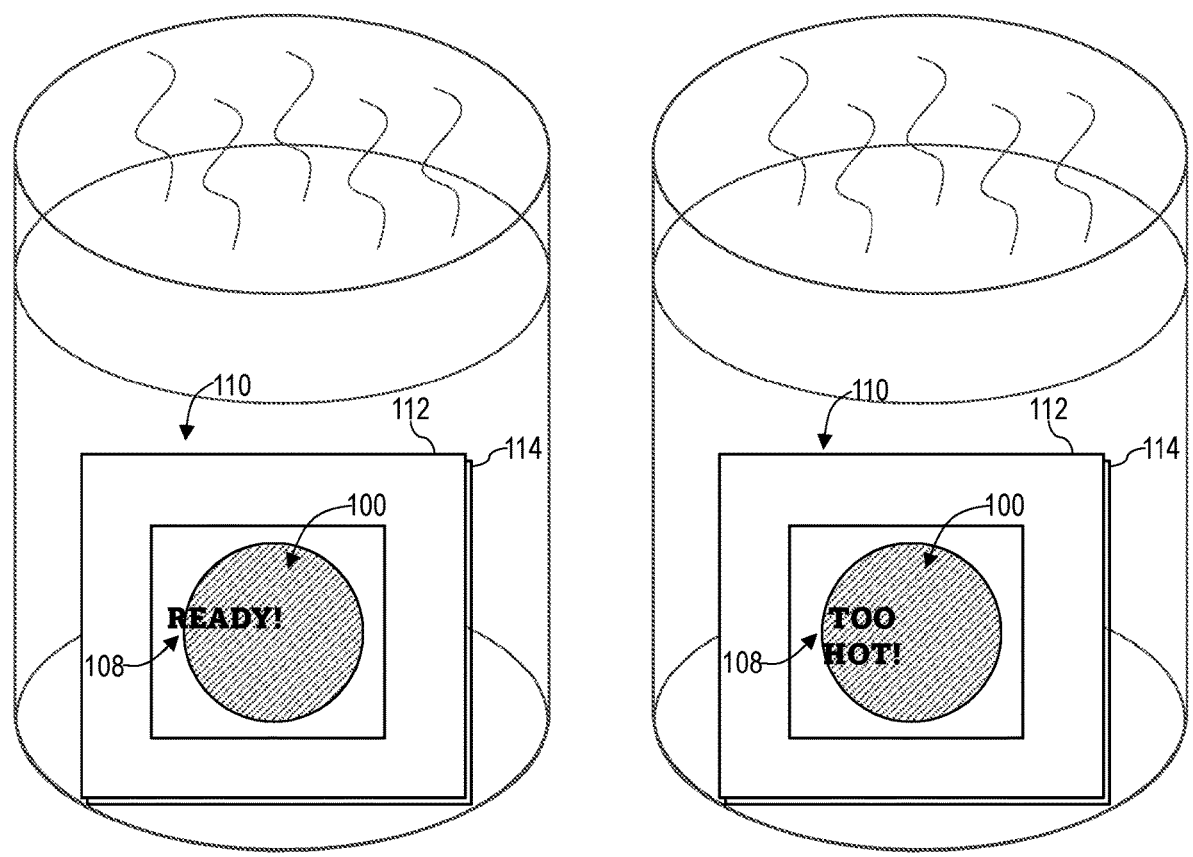
FIG. 4 shows the skin patch being heated in hot water. The left panel shows the skin patch at the predetermined temperature and indicating it is ready to be applied to skin. The right panel shows the skin patch above the predetermined temperature and indicating it is too hot to be applied to skin.

Referring to FIG. 4, the skin patch 100 in packaging 110 is placed in hot water in a container. Any container that can be heated and permits the wearer to view the packaging 110 may be used. The packaging 110 protects the skin patch 100 from contacting the water through a water-tight seal between the upper layer 112 and lower layer 114. When the packaging 110 achieves a temperature of 90 degrees Fahrenheit, for example, the thermochromic material 108 on the packaging 110 transitions to a color that contrasts with the upper layer 112, revealing the indicator provided by the thermochromic material 108 and indicates that the skin patch 100 is ready to be removed from the container and applied to the skin of the wearer. As a safety precaution, an additional indicator in a different thermochromic material 108 changes color when the skin patch 100 is too hot and may pose a burn risk if applied to the skin. The temperature at which burns can occur according to medical professionals is 105 degrees Fahrenheit. However, in order to create a safe product, at or above 100 degrees Fahrenheit, for example, the thermochromic material 108 can visibly indicate that the product is too hot for use.

Figure 5:
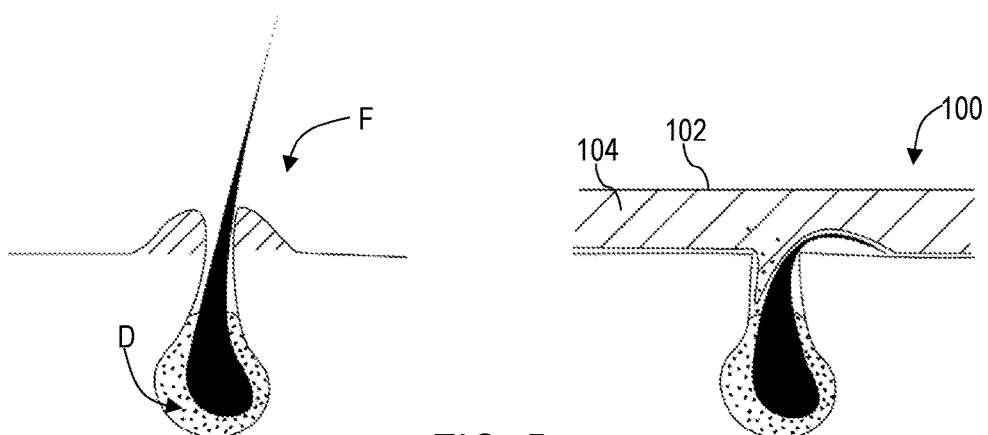
FIG. 5 is a schematic of a hair follicle (left panel) and a hair follicle covered by a skin patch (right panel).

Referring to FIG. 5, an inflamed hair follicle F having debris D therein is shown in the left panel. In the right panel, a skin patch 100 is adhered to skin over the hair follicle F. A benefit of heating the skin patch 100 is that it promotes the expansion of the hair follicle F for loosening the debris D within the hair follicle. The hydrocolloid layer 104, which is formable, may penetrate into the hair follicle F. The same would apply to pores.

Dilating pores and hair follicles allows the hydrocolloid layer 104 to assist with healing a blemish. The hydrocolloid layer 104 creates a moist wound healing environment, to promote faster healing. The outer layer 102 provides a physical barrier between the blemish and any cosmetic, such as concealer, that the wearer might also use to cover up the blemish.

Figure 6:
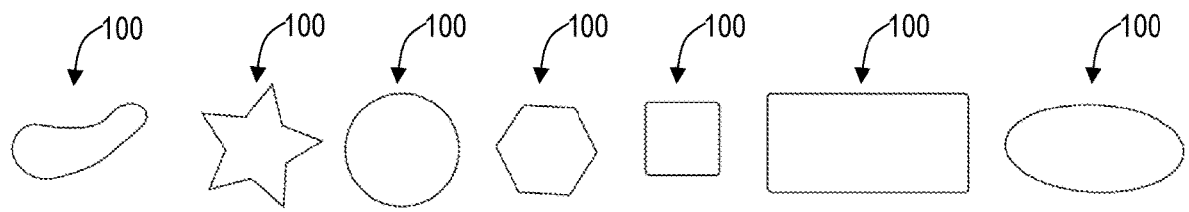
FIG. 6 is a top view of various alternative shapes and sizes for the skin patch.

Referring to FIG. 6, the skin patch 100 can come in various shapes and sizes such as the examples shown.

The thermochromic material 108 can likewise be applied to the skin patch 100 and/or packaging 110 in various shapes and configurations.

Figure 7:
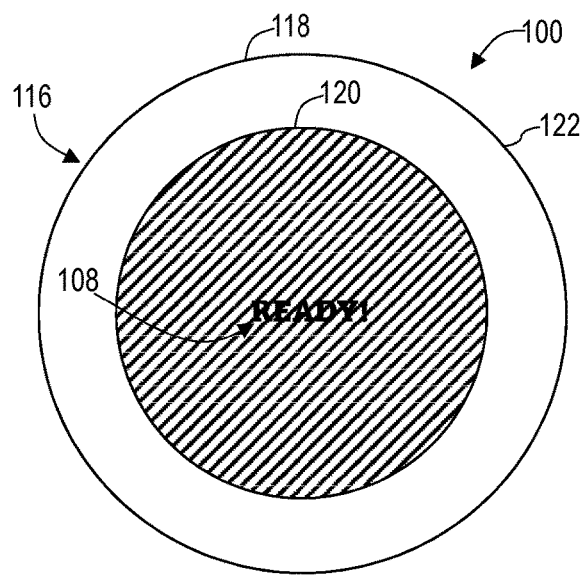
FIG. 7 is a top view of another example of the skin patch.

Referring to FIG. 7, another example of the skin patch 100 includes an adhesive tape 116, including a plastic film 118 such as a layer of polyethylene, polyurethane, polyester, or the like with an adhesive on the skin contacting side thereof. The adhesive may be an adhesive suitable for skin contact such as acrylic, polydimethylsiloxane, or the like. The tape 116 is joined to the outer layer 102 of the skin patch 100 and has a perimeter 122 that extends beyond a perimeter 120 of the hydrocolloid layer 104, creating a border about the hydrocolloid layer 104. Benefits of this example may include greater discretion by permitting better concealment of the skin patch 100 when worn, more adhesion to the skin, and to further protect the hydrocolloid layer 104.

The skin patch 100 may be modified in many different ways without departing from the scope of what is claimed. The scope of the claims is not limited to the particular features and examples described above.

That which is claimed is:

1. A method of treating a skin blemish, the method comprising:
   heating a hydrocolloid skin patch with a thermochromic material that indicates the hydrocolloid skin patch is at a predetermined temperature; and
   applying the hydrocolloid skin patch to the skin blemish once the thermochromic material indicates the hydrocolloid skin patch is at the predetermined temperature, wherein the thermochromic material is on waterproof packaging encapsulating the hydrocolloid skin patch and heating is performed by heating the waterproof packaging encapsulating the hydrocolloid skin patch in hot water.

2. The method of claim 1, wherein the predetermined temperature is 80 to 100 degrees F.

3. The method of claim 1, wherein the predetermined temperature is 105 degrees F.

4. The method of claim 1, wherein the waterproof packaging has an upper layer and a lower layer that are attached together along a perimeter thereof.

5. The method of claim 1, wherein the thermochromic material indicates whether the hydrocolloid skin patch is too hot for safe application to skin.

6. The method of claim 1, wherein the thermochromic material indicates whether the hydrocolloid skin patch is below the predetermined temperature, at the predetermined temperature, and above the predetermined temperature.

7. The method of claim 1, wherein the hydrocolloid skin patch includes at least one water boiling point elevating agent selected from calcium chloride, sodium chloride, and acetic acid.

8. The method of claim 1, wherein the hydrocolloid skin patch includes a hydrocolloid layer configured to adhere to skin and a waterproof outer layer over the hydrocolloid layer.

\* \* \* \* \*